J. C. Tobias
Harness Saddle.

Nº 35,656. Patented June 17, 1862.

Witnesses
J. W. Coombs
R. S. Spencer

Inventor.
John C. Tobias
per Munn & Co.
Attorneys

UNITED STATES PATENT OFFICE.

JOHN C. TOBIAS, OF MIDDLEPORT, ILLINOIS, ASSIGNOR TO HIMSELF, AND HENRY C. KIRK, OF WHITE COUNTY, INDIANA.

IMPROVEMENT IN HARNESS-SADDLES.

Specification forming part of Letters Patent No. 35,656, dated June 17, 1862.

*To all whom it may concern:*

Be it known that I, JOHN C. TOBIAS, of Middleport, in the county of Iroquois and State of Illinois, have invented a new and Improved Self-Adjusting Saddle or Pad-Tree for Harnesses; and I do hereby declare that the following is a full, clear, and exact description of the same, reference being had to the annexed drawings, making a part of this specification, in which—

Figure 1:
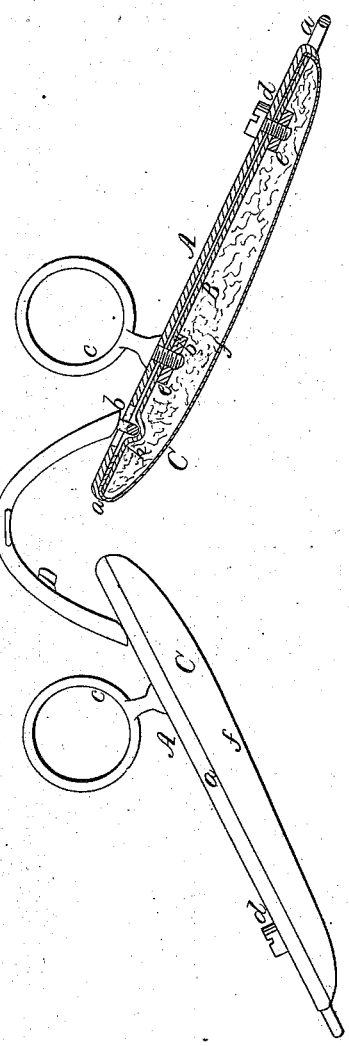
Figure 2:
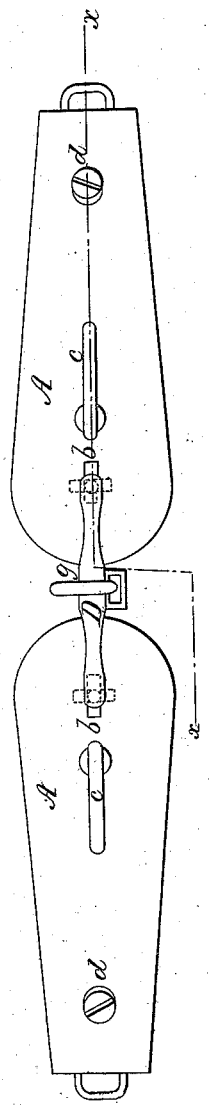

Figure 1 is a front view of my invention, a portion being bisected, as indicated by the line $x\ x$, Fig. 2; Fig. 2, a plan or top view of the same.

Similar letters of reference indicate corresponding parts in the two figures.

To enable those skilled in the art to fully understand and construct my invention, I will proceed to describe it.

A A are two metal plates, the form of which is shown clearly in Fig. 2. These plates have a flange, $a$, turned down all around their edge, and each plate A has a longitudinal slot, $b$, made through it near its inner end.

B B are plates, which are fitted at the under sides of the plates A A, and within their flanges $a$, the plates B being secured to A by the screws $b'$ of the terrets or rein-guides $c$ and supplemental screws $d$, which pass respectively through nuts $e\ e$, attached to the plates B.

C C are pads, the covers $f$ of which lap over the edges of the plates B and fit between them and plates A, the screws $b'\ d$ firmly securing the edges of the covering of the pads between the plates. The pads are stuffed in the usual or in any proper way.

D represents a curved or bow-shaped metal link which connects the two plates, A A, together. This link has a check-rein hook, $g$, secured to its upper part at its center, and to each end of the link at its under side a cross-bar, $h$, is attached. These cross-bars have a position at right angles with the link and serve as hooks to form the connection between the link and plates A A. These cross-bars $h$ are inserted in the plates A by placing them in line with the slots $b$, and passing them through said slots and then turning the link around in proper position. This mode of connection, it will be seen, allows the plates A A a requisite degree of play, so that the saddle or tree may yield or give to the movements of the animal in traveling and also conform to the shape of the animal—that is to say, the two plates A A and pads attached may assume a greater or less inclination, as may be required, in order to admit of the proper fitting of the pads to the back of the animal.

The device, it will be seen, may be very readily and cheaply constructed, and there are no parts liable to become deranged by use.

Having thus described my invention, I claim as new and desire to secure by Letters Patent—

As an improved article of manufacture, a harness-saddle or pad-tree composed of plates A B, pad C, and cover $f$, made and united in the manner herein shown and described.

JOHN C. TOBIAS.

Witnesses:
C. F. MCNEILL,
W. B. WHITE.